United States Patent
Ye et al.

(10) Patent No.: US 11,928,017 B2
(45) Date of Patent: Mar. 12, 2024

(54) POINT ANOMALY DETECTION

(71) Applicant: Google LLC, Mountain View, CA (US)

(72) Inventors: Zichuan Ye, Mountain View, CA (US); Jiashang Liu, Kirkland, WA (US); Forest Elliott, Mountain View, CA (US); Amir Hormati, Mountain View, CA (US); Xi Cheng, Kirkland, WA (US); Mingge Deng, Kirkland, WA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 17/664,409

(22) Filed: May 21, 2022

(65) Prior Publication Data

US 2022/0382622 A1    Dec. 1, 2022

Related U.S. Application Data

(60) Provisional application No. 63/193,038, filed on May 25, 2021.

(51) Int. Cl.
G06F 11/07  (2006.01)

(52) U.S. Cl.
CPC ...... *G06F 11/0793* (2013.01); *G06F 11/0709* (2013.01); *G06F 11/079* (2013.01)

(58) Field of Classification Search
CPC . G06F 11/0709; G06F 11/079; G06F 11/0793
See application file for complete search history.

(56) References Cited

U.S. PATENT DOCUMENTS

| | | | | |
|---|---|---|---|---|
| 8,868,474 | B2* | 10/2014 | Leung | G06F 11/30 706/12 |
| 10,600,003 | B2* | 3/2020 | Nie | G06F 11/0709 |
| 2016/0277268 | A1* | 9/2016 | Brown | G06F 11/3075 |
| 2019/0156211 | A1* | 5/2019 | Dong | G06N 3/04 |

(Continued)

FOREIGN PATENT DOCUMENTS

CN    111352971 A    6/2020

OTHER PUBLICATIONS

Aug. 26, 2022 Written Opinion (WO) of the International Searching Authority (ISA) and International Search Report (ISR) issued in International Application No. PCT/US2022/072514.

(Continued)

*Primary Examiner* — Joseph R Kudirka
(74) *Attorney, Agent, or Firm* — Honigman LLP; Brett A. Krueger

(57) ABSTRACT

A method includes receiving a point data anomaly detection query from a user. The query requests the data processing hardware to determine a quantity of anomalous point data values in a set of point data values. The method includes training a model using the set of point data values. For at least one respective point data value in the set of point data values, the method includes determining, using the trained model, a variance value for the respective point data value and determining that the variance value satisfies a threshold value. Based on the variance value satisfying the threshold value, the method includes determining that the respective point data value is an anomalous point data value. The method includes reporting the determined anomalous point data value to the user.

26 Claims, 9 Drawing Sheets

(56) References Cited

U.S. PATENT DOCUMENTS

2019/0286506 A1* 9/2019 Cheng ................. G06F 11/0793
2022/0114437 A1* 4/2022 Watt ...................... G06F 16/953

OTHER PUBLICATIONS

Pan Dawei et al: "Satellite Telemetry Data Anomaly Detection Using Bi-LSTM Prediction Based Model", 2020 IEEE International Instrumentation and Measurement Technology Conference (12MTC), IEEE,May 25, 2020 (May 25, 2020), pp. 1-6.

* cited by examiner

POINT ANOMALY DETECTION

CROSS REFERENCE TO RELATED APPLICATIONS

This U.S. patent application claims priority under 35 U.S.C. § 119(e) to U.S. Provisional Application 63/193,038, filed on May 25, 2021 The disclosure of this prior application is considered part of the disclosure of this application and is hereby incorporated by reference in its entirety.

TECHNICAL FIELD

This disclosure relates to point anomaly detection.

BACKGROUND

Anomaly detection in point data has a wide range of applications such as manufacturing, agriculture, health care, digital advertising, etc. Due to the complexity in both theoretical and practical aspects, anomaly detection remains one of the most challenging problems in machine learning. For example, learning and identifying anomalies of point data requires many techniques ranging from feature engineering, training, analysis, feedback, and model fine-tuning. Additionally, anomaly detection applications often occur in multiple components and services, which each individually handle data storage, processing, modeling experiments, prediction, and deployments, which leads to a fragmented experience for users.

SUMMARY

One aspect of the disclosure provides a computer-implemented method executed by data processing hardware of a cloud database system that causes the data processing hardware to perform operations. The operations include receiving a point data anomaly detection query from a user. The point data anomaly detection query requests the data processing hardware to determine a quantity of anomalous point data values in a set of point data values. The operations include training a model using the set of point data values. For at least one respective point data value in the set of point data values, the operations include determining, using the trained model, a variance value for the respective point data value and determining that the variance value satisfies a threshold value. Based on the variance value satisfying the threshold value, the operations include determining that the respective point data value is an anomalous point data value. The operations include reporting the determined anomalous point data value to the user.

Implementations of the disclosure may include one or more of the following optional features. In some implementations, the model includes an autoencoder model. In further implementations, the autoencoder model includes a sequence of hidden layers. In other further implementations, the variance value includes a reconstruction loss of the respective point data value. In even further implementations, determining the reconstruction loss of the respective point data value includes determining a mean absolute error reconstruction loss, determining a mean squared error reconstruction loss, and determining a mean squared log error reconstruction loss.

In some examples, the model includes a K-means model. In further examples, the variance value includes a metric normalized distance of the respective point data value. Optionally, the threshold value is based on a recall target or a precision target provided by the user.

In some implementations, the point data anomaly query includes a single Structured Query Language (SQL) query. In further implementations, the single SQL query requests the data processing hardware to determine respective quantities of anomalous point data values in a plurality of sets of point data values.

Optionally, the at least one respective point data value in the set of point data values includes a historical point data value. The historical point data value may be used to train the model.

In some examples, the operations further include, for an additional point data value not used to train the model, determining, using the trained model, a variance value for the additional point data value. In some implementations, training the model uses each point data value in the set of point data values.

Another aspect of the disclosure provides a system. The system includes data processing hardware and memory hardware in communication with the data processing hardware. The memory hardware stores instructions executed on the data processing hardware and causing the data processing hardware to perform operations. The operations include receiving a point data anomaly detection query from a user. The point data anomaly detection query requests the data processing hardware to determine a quantity of anomalous point data values in a set of point data values. The operations include training a model using the set of point data values. For at least one respective point data value in the set of point data values, the operations include determining, using the trained model, a variance value for the respective point data value and determining that the variance value satisfies a threshold value. Based on the variance value satisfying the threshold value, the operations include determining that the respective point data value is an anomalous point data value. The operations include reporting the determined anomalous point data value to the user.

Implementations of the disclosure may include one or more of the following optional features. In some implementations, the model includes an autoencoder model. In further implementations, the autoencoder model includes a sequence of hidden layers. In other further implementations, the variance value includes a reconstruction loss of the respective point data value. In even further implementations, determining the reconstruction loss of the respective point data value includes determining a mean absolute error reconstruction loss, determining a mean squared error reconstruction loss, and determining a mean squared log error reconstruction loss.

In some examples, the model includes a K-means model. In further examples, the variance value includes a metric normalized distance of the respective point data value. Optionally, the threshold value is based on a recall target or a precision target provided by the user.

In some implementations, the point data anomaly query includes a single Structured Query Language (SQL) query. In further implementations, the single SQL query requests the data processing hardware to determine respective quantities of anomalous point data values in a plurality of sets of point data values.

Optionally, the at least one respective point data value in the set of point data values includes a historical point data value. The historical point data value may be used to train the model.

In some examples, the operations further include, for an additional point data value not used to train the model, determining, using the trained model, a variance value for the additional point data value. In some implementations, training the model uses each point data value in the set of point data values.

The details of one or more implementations of the disclosure are set forth in the accompanying drawings and the description below. Other aspects, features, and advantages will be apparent from the description and the drawings, and from the claims.

DESCRIPTION OF DRAWINGS

Like reference symbols in the various drawings indicate like elements.

DETAILED DESCRIPTION

Anomaly detection in point data has a wide range of applications such as manufacturing, agriculture, health care, digital advertising, etc. Due to the complexity in both theoretical and practical aspects, anomaly detection remains one of the most challenging problems in machine learning. For example, learning and identifying anomalies of point data requires many techniques ranging from feature engineering, training, analysis, feedback, and model fine-tuning. Additionally, anomaly detection applications often occur in multiple components and services, which each individually handle data storage, processing, modeling experiments, prediction, and deployments, which leads to a fragmented experience for users.

Implementations herein are directed toward a point data anomaly detection system that is capable of automatically detecting anomalies at large-scale (e.g., in a cloud database system). The system utilizes comprehensive machine learning models and tools and offers a unified interface that explicitly detects anomalous samples among tabular data in a cloud database system. The system delivers results with enhanced sparse data representations and offers a clustering-based anomaly detection approach that supports geography features in a distributed computing environment. The system provides a unified interface to detect non-time-series data anomalies using, for example, a Structured Query Language (SQL) interface.

Figure 1:
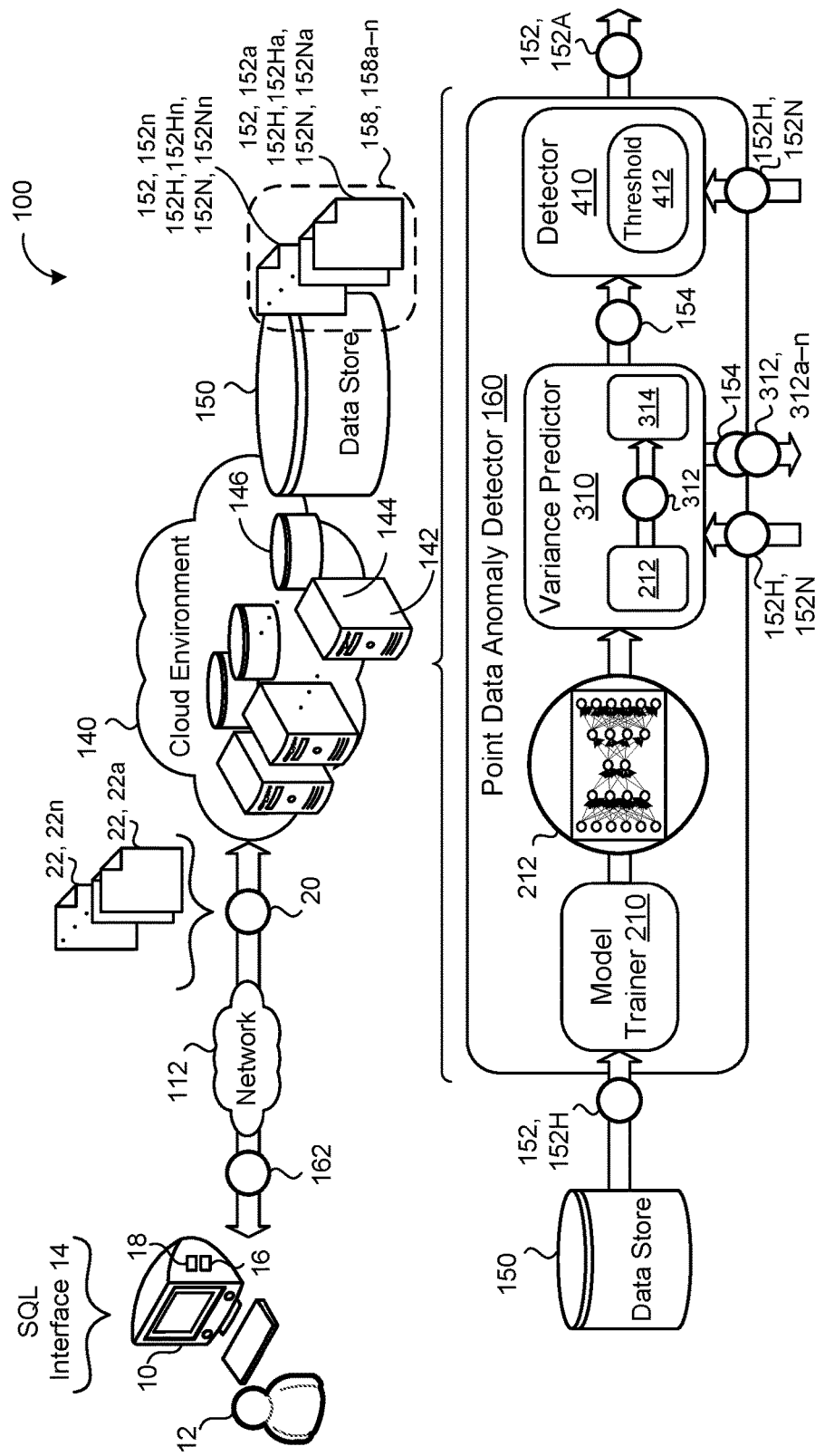
FIG. 1 is a schematic view of an example system for detecting anomalies in point data.

Referring now to FIG. 1, in some implementations, an example point data anomaly detection system 100 includes a remote system 140 in communication with one or more user devices 10 via a network 112. The remote system 140 may be a single computer, multiple computers, or a distributed system (e.g., a cloud environment) having scalable/elastic resources 142 including computing resources 144 (e.g., data processing hardware) and/or storage resources 146 (e.g., memory hardware) A data store 150 (i.e., a remote storage device) may be overlain on the storage resources 146 to allow scalable use of the storage resources 146 by one or more of the clients (e.g., the user device 10) or the computing resources 144. The data store 150 is configured to store a plurality of data blocks within one or more tables 158, 158a-n (i.e., a cloud database). The data store 150 may store any number of tables 158 at any point in time. The tables 158 (i.e., the data blocks) include any number of point data values 152, 152a-n that may be time-series point data values (i.e., the point data values are associated with a time value) or may be non-time-series data values (i.e., the point data values do not have any association to a time value).

The remote system 140 is configured to receive a point data anomaly detection query 20 from a user device 10 associated with a respective user 12 via, for example, the network 112. The user device 10 may correspond to any computing device, such as a desktop workstation, a laptop workstation, or a mobile device (i.e., a smart phone). The user device 10 includes computing resources 18 (e.g., data processing hardware) and/or storage resources 16 (e.g., memory hardware). In some implementations, the user 12 constructs the query 20 using an SQL interface 14. Each point data anomaly detection query 20 requests the remote system 140 to determine whether one or more anomalies are present (i.e., a quantity of anomalies present) in one or more detection requests 22, 22a-n.

The remote system 140 executes a point data anomaly detector 160 for detecting anomalous point data values 152, 152A in historical point data values 152, 152H and/or novel point data values, 152, 152N. As described further below, the historical point data values 152H represent point data values 152 that a model 212 trains on while novel point data values 152N represent point data values 152 that the model 212 does not train on. For example, the point data anomaly detector 160 receives the novel point data values 152N after training the model 212 is complete. The point data anomaly detector 160 is configured to receive the query 20 from the user 12 via the user device 10. Each query 20 may include multiple detection requests 22. Each detection request 22 requests the point data anomaly detector 160 detect a quantity of anomalous point data values 152A in one or more different sets of point data values 152. That is, the query 20 may include multiple detection requests 22 each requesting the remote system 140 to detect anomalous point data values 152A in the point data values 152 located in one or more tables 158 stored on the data store 150. Alternatively, the query 20 includes the point data values 152. In this case, the user 12 (via the user device 10) may provide the point data values 152 when the point data values 152 are not otherwise available via the data storage 150. In some examples, the point data values 152 are stored in databases (e.g., with multiple columns and/or multiple rows).

Thus, the query 20 may include any number of detection requests 22, where each detection request 22 instructs the remote system 140 to determine or identify or quantify anomalies present in one or more sets of point data values 152 using the point data anomaly detector 160. For example, if the point data values 152 correspond to transactions, the point data anomaly detector 160 identifies anomalous point data values 152A as fraudulent transactions. Each detection request 22 may correspond to one or more specific point data values 152 and request detection of one or more specifically defined or bounded anomalies so that when the remote system 140 processes the detection requests 22, the point data anomaly detector 160 separately (consecutively or simultaneously) determines presence of any anomalies in the one or more identified sets of point data values 152. In other words, the query 20 may include a plurality of detection requests 22 each relating to the same or different point data values 152 and the same or different potential anomalies. The remote system 140 responds to the query 20 by communicating each of the one or more detection requests 22 to the point data anomaly detector 160. Thus, the query 20 includes one or more requests 22 for the point data anomaly detector 160 to determine one or more anomalous point data values 152A in one or more different sets of point data values 152 simultaneously. Because the data store 150 and the point data anomaly detector 160 may both operate on the data processing hardware 144 and memory hardware 146 of the remote system 140, the remote system 140 may receive the query 20 from the user device 10, process the detection requests 22, and provide the response 162 identifying the anomalous point data values 152A to the user device 10 without the need to utilize data processing or storage resources outside the remote system 140.

The point data anomaly detector 160 includes a model trainer 210 that generates and trains one or more anomaly detection models 212 for each detection request 22. The model trainer 210 may train multiple models 212 simultaneously. As discussed further below, the model trainer 210 trains anomaly detection models 212 of any suitable type, for example an autoencoder model 212E (FIG. 2A) or a K-means model 212K (FIG. 2B). The model trainer 210 is configured to generate and train the one or more models 212 using point data values 152 so that the generated and trained models 212 may be used to determine the anomalous point data values 152A. That is, the models 212 are trained using point data values 152 so that anomalous point data values 152A may be identified based on predictions or inferences of the models 212. The model trainer 210, in some examples, trains the anomaly detection model(s) 212 on historical point data values 152H retrieved from one or more tables 158 stored on the data store 150 that are associated with the detection requests 22 and/or user 12. The historical point data values 152H may represent a selected or random subset or sampling of the point data values 152 so that the model 212 is trained using less than all of the point data values 152 that the point data anomaly detector 160 receives. Point data values 152 that are not used to train the model 212 (but nevertheless may be analyzed to determine anomalous point data values 152A) may be referred to as novel point data values 152N. Novel point data values 152N may include point data values 152 that are collected after the model 212 is trained or point data values 152 collected before the model 212 is trained but that are not used to train the model 212. The model trainer 210 may train the model 212 using only historical point data values 152H to conserve processing resources, to reduce training time, and/or because of a characteristic of the historical point data values 152H (such as the historical point data values 152H being identified as not being anomalous point data values 152A).

Figure 2A:
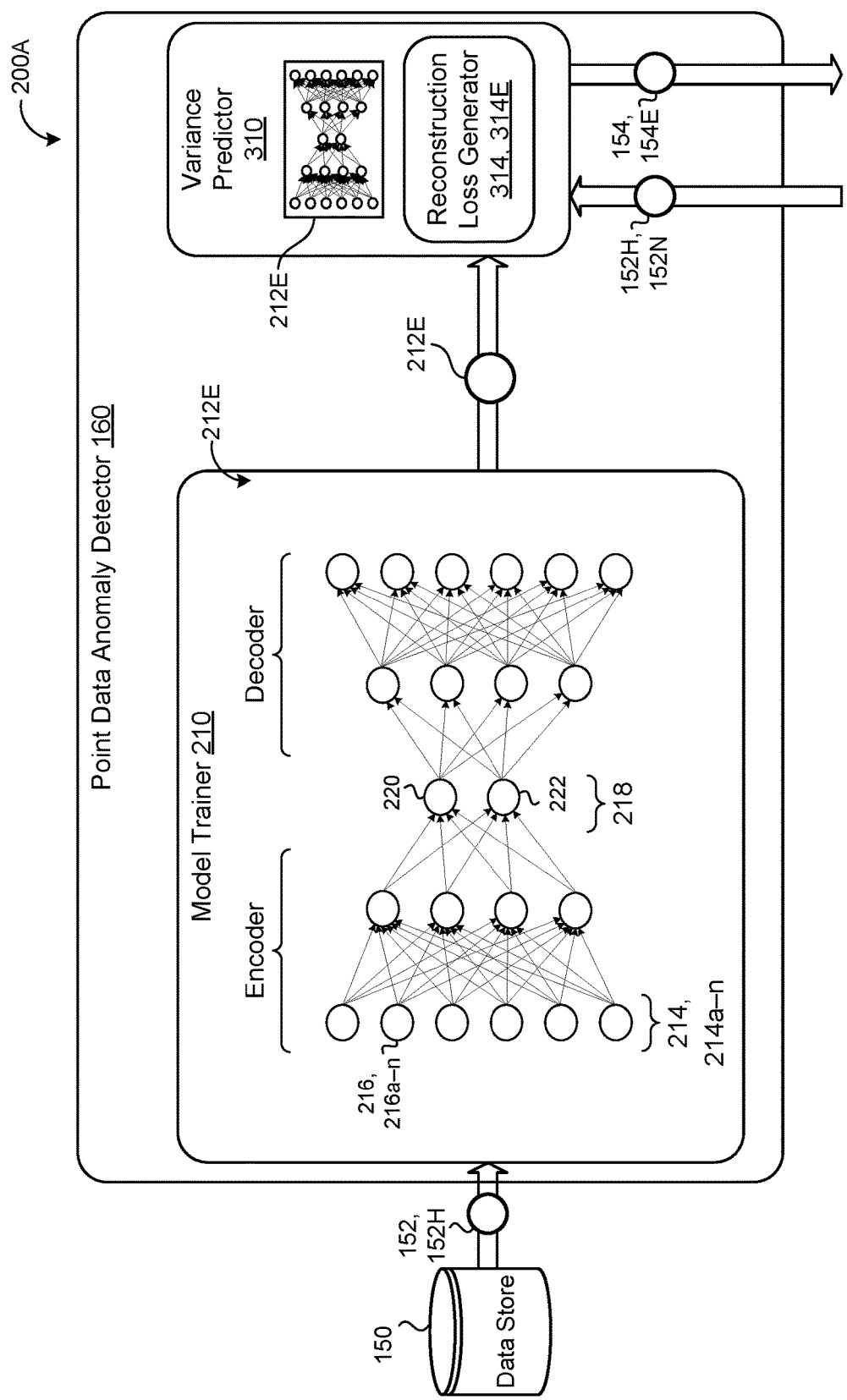
FIG. 2A is a schematic view of a model trainer training an autoencoder model using point data.
Figure 2B:
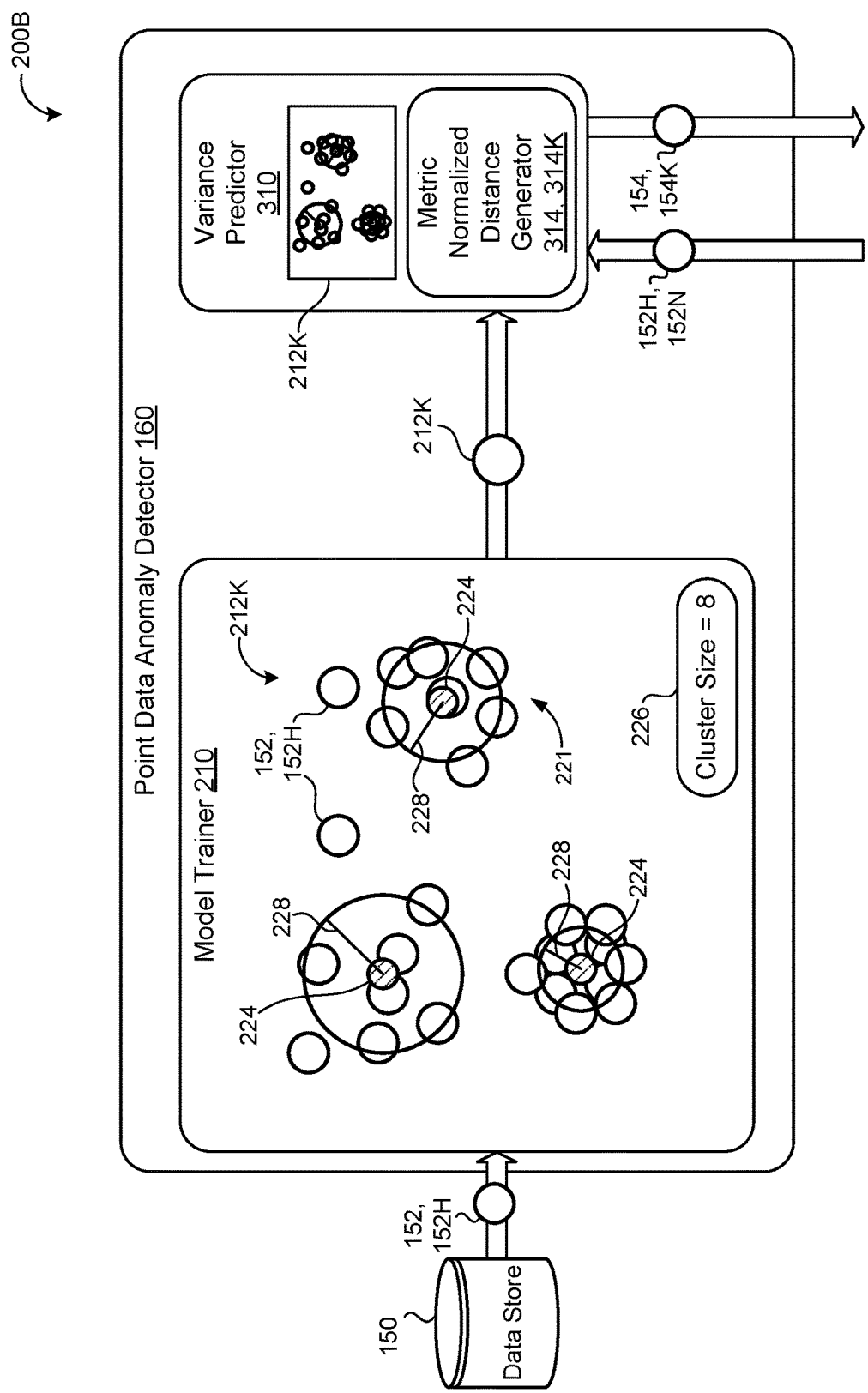
FIG. 2B is a schematic view of the model trainer training a K-means model using point data.

Referring now to FIG. 2A, an autoencoder model is a type of artificial neural network that learns efficient data encodings in an unsupervised manner. The aim of an autoencoder is to learn a latent representation or coding for a set of data by training the network to ignore signal noise. When the model trainer 210 generates one or more autoencoder models 212E based on the historical point data values 152H, as exemplified in schematic view 200A of FIG. 2A, the historical point data values 152H are passed through an encoder side of layers 214, 214a-n of neurons or nodes 216, 216a-n to generate the encoding 218. From the encoding 218, the model trainer 210 generates a decoder side of layers 214 of nodes 216 to reconstruct or represent as close as possible the original input of historical point data values 152H. In some examples, the autoencoder model 212E is a dense autoencoder model or a sparse autoencoder model depending, for example, upon an internal structure of the historical point data values 152H, complexity of the historical point data values 152H, and/or the presence of sparse data in the historical point data values 152H. As discussed further below, the generated autoencoder model 212E is used by a variance predictor 310 to determine a reconstruction loss 154, 154E for the respective historical point data values 152H and/or for novel point data values 152N that are input to the autoencoder model 212E after it is generated.

The point data anomaly detector 160, in some implementations, defines parameters to describe a distribution for each dimension or layer 214 of the autoencoder model 212E. For example, the autoencoder model 212E has a sequence of hidden layers 214 with thirty-two, sixteen, four, sixteen, and thirty-two nodes 216 respectively. Additionally, the model trainer 210 may train the autoencoder model 212E using a relatively small number of epochs. For example, the model trainer 210 trains the autoencoder model using five epochs.

Assuming a normal distribution, the encoding 218 may include a mean 220 and/or a variance 222 of the encoder side of layers 214. The model trainer 210 may generate the decoder side of layers 214 based on a sampling from the encoder side of layers 214. In order to perform backpropagation to train the autoencoder model 212E and optimize the encoding 218, the sampling used to generate the decoder side of layers 214 must be taken into account by shifting by the mean 220 of the encoding 218 and scaling by the variance 222 of the encoding 218. Thus, the model trainer 210 generates and trains the autoencoder model 212E based on historical point data values 152H to arrive at the trained autoencoder model 212E (including the encoding 218) that is used by the variance predictor 310. That is, the model trainer 210 provides the trained autoencoder model 212E to the variance predictor 310.

Referring now to FIG. 2B, K-means is a clustering algorithm that divides given data points into several clusters centered on centroids. When the model trainer 210 generates one or more K-means models 212K based on the historical point data values 152H, as exemplified in schematic view 200B of FIG. 2B, the model trainer 210 defines centroids 224 and determines a cluster size 226 and a cluster radius 228 for each cluster 221. The centroid 224 may represent an expected or target value for the point data values 152 input by the user 12 or generated based on the historical point data values 152H provided to the model trainer 210, such as a mean or median value of the historical point data values 152H. During each iteration of generating the K-means model 212 K, the model trainer 210 may store the centroids 224 and determine cluster information for each centroid 224, including the cluster size 226 and the cluster radius 228. The cluster size 226 represents the number of point data values 152 assigned to the centroid 224. The cluster radius 228 represents the root mean square of the distances between the centroid 224 and the point data values 152 assigned to the centroid 224. The model trainer 210 may determine any number of clusters 221 having any suitable cluster size 226. For example, the model trainer 210 sets the cluster size 226 to eight so that only eight point data values 152 are assigned to each centroid 224. The K-means model 212K provides a cluster-based anomaly detection approach and supports geography features. As discussed further below, the generated K-means model 212K is used by the variance predictor 310 to determine a metric normalized distance 154, 154K for the respective historical point data values 152H.

Referring back to FIG. 1, the variance predictor 310, using the trained model 212, predicts or determines or generates the variance value 154 for each input point data value 152. The variance value 154 may represent a difference between an expected value for the particular point data value 152 based on the trained model 212 and an actual or recorded value (i.e., a ground truth) for the point data value 152. In other words, the variance predictor 310, in some implementations, determines or identifies predicted or expected values 312, 312a-n for each point data value 152 based on the trained model 212 and, using a variance value generator 314, compares the respective predicted or expected value 312 to the actual or recorded value of the point data value 152 to determine the variance value 154 for the respective point data value 152. The variance value 154 may be a quantitative or a qualitative difference between the input point data value 152 and the expected value 312 generated from the input point data value 152 using the trained model 212. Variance values 154 are determined for historical point data values 152H and novel point data values 152N when novel point data values 152N are input to the trained model 212. For example, when the model trainer 210 generates an autoencoder model 212E, the variance predictor 310 generates or determines reconstruction losses 154E, 154Ea-n for the input point data values 152 using the autoencoder model 212E. The reconstruction loss 154E represents a difference between the recorded value for the input point data value 152 and the expected value 312 when the encoding 218 is applied to the input point data value 152. Alternatively, when the model trainer 210 generates a K-means model 212K, the variance predictor 310 generates or determines metric normalized distances 154K, 154Ka-n for the input data values 152 using the K-means model 212K. Since the centroid 224 represents the expected or target or mean value for the cluster 221 of point data values 152, the metric normalized distance 154K represents the difference between the point data value 152 and the expected or mean value of the corresponding centroid 224 (FIG. 3B). That is, when using the K-means model 212K, the variance predictor 310 may determine the expected value 312 for the input point data value 152 is the centroid 224. When the input point data value 152 is a historical point data value 152H, the variance predictor 310 compares the actual historical point data value 152H to the predicted or expected value 312 (e.g., the centroid 224) of the trained model 212 to determine the variance value 154. When the input point data value 152 is a novel point data value 152N, the point data anomaly detector 160 may input the novel point data value 152N to the trained model 212 so that the variance predictor 310 determines the variance value 154 for the respective novel point data value 152N based on an output expected value 312 for the novel point data value 152N.

Thus, the variance predictor 310 receives the trained model 212, determines the expected value 312 for one or more point data values 152 based on the trained model 212, and determines the variance value 154 for the one or more point data values 152. The variance predictor 310 may determine the variance value 154 for each historical point data value 152H and one or more novel point data values 152N. For historical point data values 152H, the model 212 has been trained using the historical point data values 152H and thus already contains the historical point data values 152H when generated by the model trainer 210 and received at the variance predictor 310. For novel point data values 152N, the model 212 has not been trained using the novel point data value 152N and thus the point data anomaly detector 160 must input the novel point data value 152N to the trained model 212 before the variance predictor may determine the variance value 154. The variance value 154 is used as an indicator of whether the point data value 152 is an anomalous point data value 152A. As discussed further below, the variance value 154 is used by a detector 410 to determine whether the corresponding input point data value 152 is an anomalous point data value 152A.

Optionally, the point data anomaly detector 160 adds the variance value 154 and/or the expected value 312 to the data table 158 to attribute the variance value 154 and/or the expected value 312 to the corresponding point data value 152. Thus, although the point data anomaly detector 160 is configured to perform an unsupervised search for anomalous point data values 152A, the user 12 may also have the option to manually view the determined variance values 154 and determined expected values 312. In some examples, the point data anomaly detector 160 further processes the input point data values 152 and determined variance values 154 and/or determined expected values 312 from the data tables 158 to update or regenerate the model(s) 212. For example, the point data anomaly detector 160 filters the input point data values 152 based on the determined variance values 154 and/or the determined expected values 312 to regenerate the model 212 using point data values 152 less likely to be anomalous.

Figure 3A:
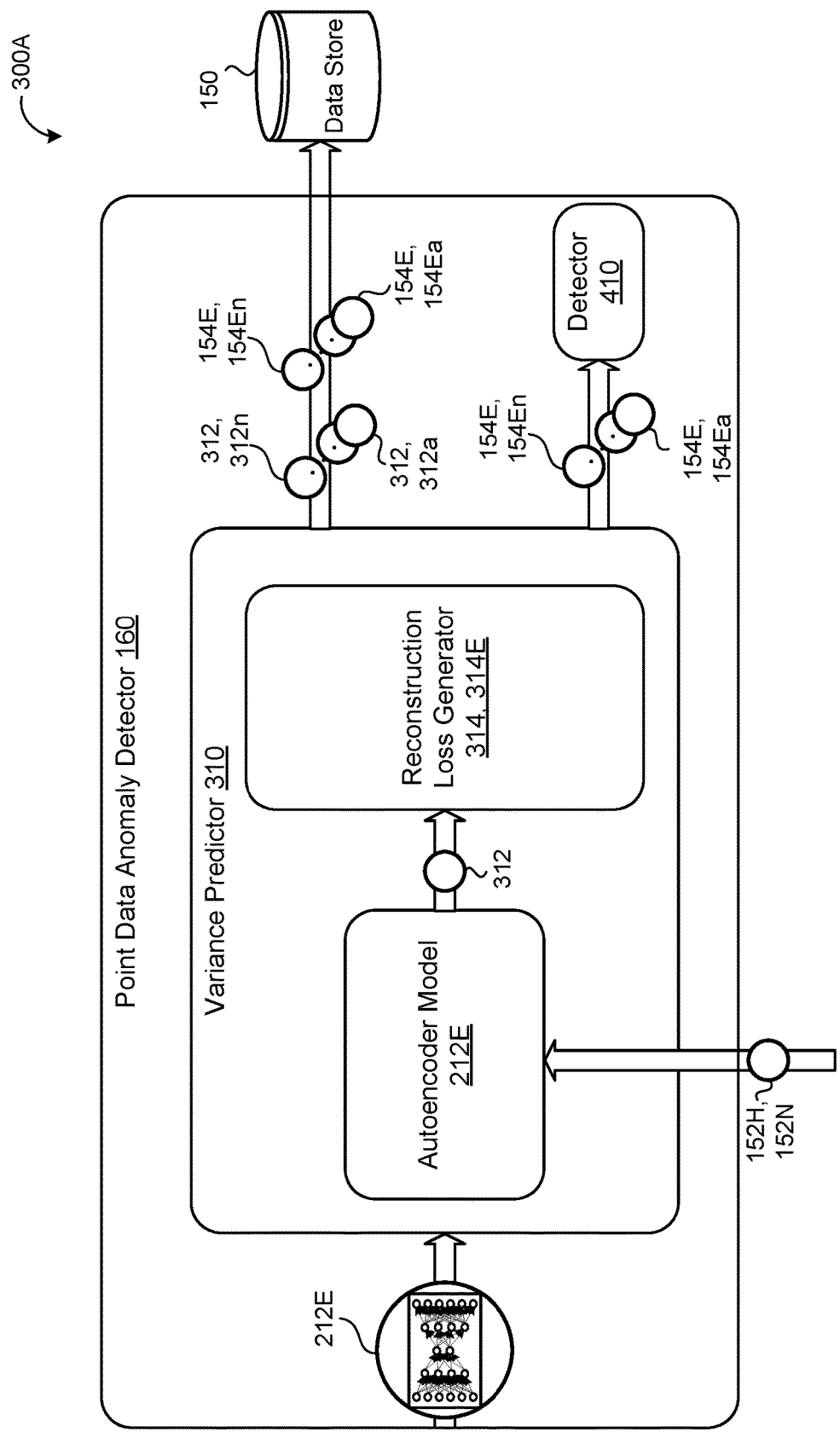
FIG. 3A is a schematic view of a variance predictor determining variance values for the point data using the trained autoencoder model of FIG. 2A.
Figure 3B:
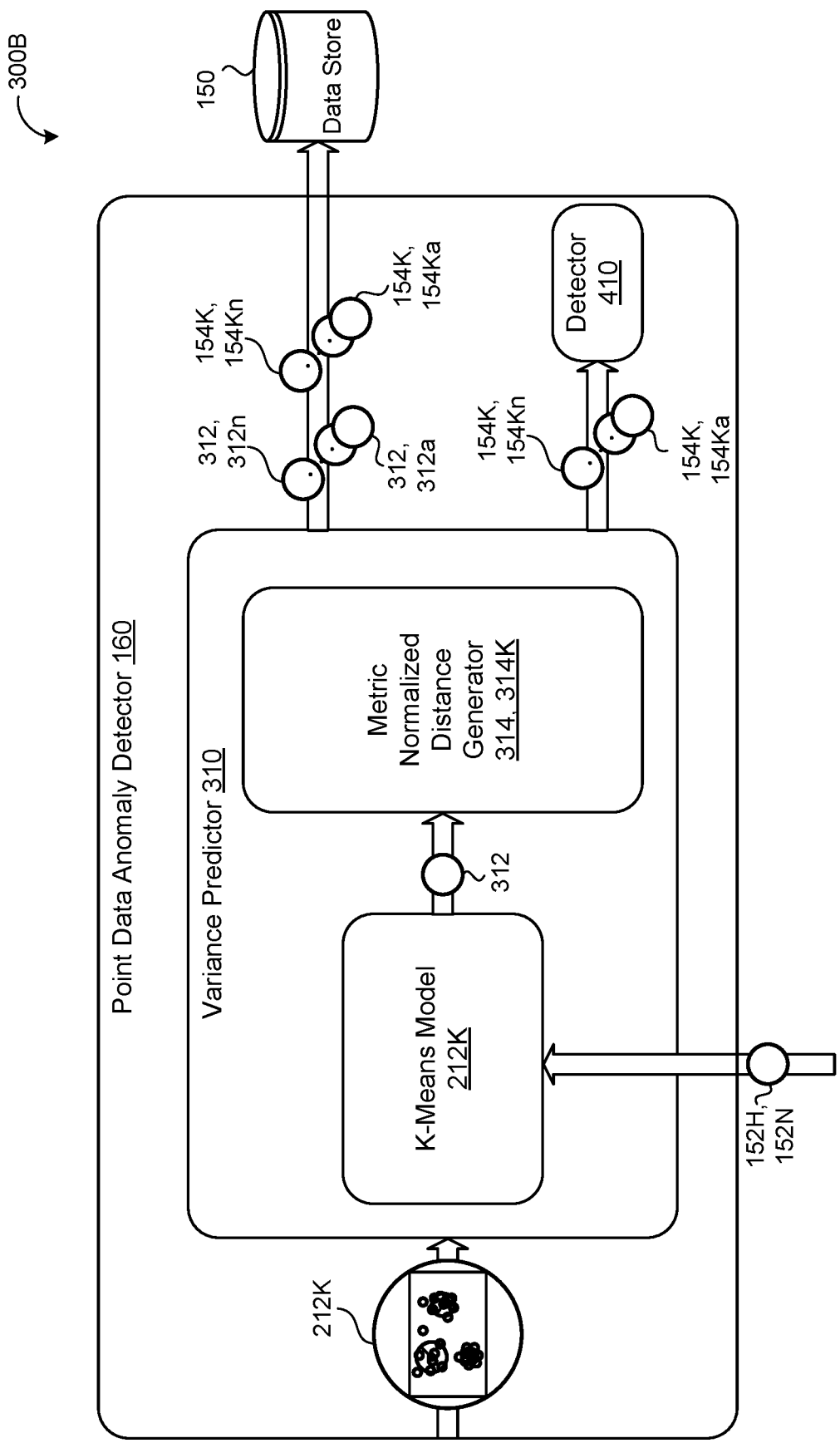
FIG. 3B is a schematic view of the variance predictor determining variance values using the trained K-means model of FIG. 2B.

Referring now to FIG. 3A, schematic view 300A includes an example where the generated model 212 is an autoencoder model 212E. In this case, the variance predictor 310 determines the reconstruction losses 154E for each individual input point data value 152. The reconstruction losses 154E of point data values 152 that are not anomalous before and after generating the autoencoder model 212E tend to have a uniform distribution that is different from the distribution of reconstruction losses 154E for anomalous point data values 152A. Thus, the reconstruction loss 154E for an anomalous point data value 152A is likely to be significantly smaller or larger than the reconstruction loss 154E for a point data value 152 that is not anomalous. In some examples, the reconstruction loss 154E includes a mean absolute error reconstruction loss, a mean squared error reconstruction loss, and/or a mean squared log error reconstruction loss (or any combination thereof).

The variance predictor 310 may predict the reconstruction loss 154E for each of the historical point data values 152H. That is, after the autoencoder model 212E is trained, the point data anomaly detector 160 may provide each historical point data value 152H to the trained autoencoder model 212E, and based on the expected value 312 generated using the trained autoencoder model 212E, a reconstruction loss generator 314, 314E of the variance predictor 310 generates the reconstruction loss 154E for the respective historical point data value 152H. The variance predictor 310 may also predict the reconstruction loss 154E for novel point data values 152N.

The model trainer 210, in this example, generates the autoencoder model 212E and provides the autoencoder model 212E (which includes the encoding 218) to the variance predictor 310 for determining the reconstruction losses 154E. As shown, the variance predictor 310 identifies historical point data values 152H within the trained autoencoder model 212E and inputs any provided novel point data values 152N to the trained autoencoder model 212E to determine the expected values 312 for the respective point data values 152. Based on the expected values 312 and the recorded or attributed values for the point data values 152, the reconstruction loss generator 314E generates the reconstruction losses 154E for the point data values 152N. That is, the input point data values 152 (i.e., the historical point data values 152H and any novel point data values 152N) are fed through the encoding 218 of the trained autoencoder model 212E to output corresponding expected data values 312, from which the corresponding reconstruction losses 154E may be derived. The reconstruction losses 154E are provided to the detector 410 for determining whether the corresponding point data values 152 are anomalous point data values 152A and, optionally, to the data store 150 for incorporation into the data tables 158.

As shown in FIG. 3B, schematic view 300B includes an example where the generated model 212 is a K-means model 212K. In this case, the variance predictor 310 determines the metric normalized distance 154K for each individual input point data value 152. The metric normalized distance 154K for an input point data value 152 represents the smallest distance between the point data value 152 to each centroid 224 divided by the cluster radius 228. Thus, point data values 152 having a higher metric normalized distance 154K are more likely to be anomalous as the point data value 152 will be further from a closest centroid 224. Optionally, the K-means model 212K may be a pre-trained model so that the position of the centroid 224 for each cluster 221 is predetermined (such as based on a known or ideal value provided in the set of point data values 152) and the metric normalized distances 154K, for each point data value 152 are determined based on the prepositioned centroid 224.

The variance predictor 310, in some implementations, determines the metric normalized distance 154K for both historical point data values 152H (i.e., those point data values 152 used to train the K-means model 212K) and novel point data values 152N (i.e., those point data values 152 not used to train the K-means model 212K) that are received after training the model 212 is complete. For each input point data value 152, the variance predictor 310 determines the expected value 312 (e.g., the centroid 224 assigned to the point data value 152) and, based on the expected value 312, a metric normalized distance generator 314, 314K generates the metric normalized distance 154K of the point data value 152.

The model trainer 210, in this example, generates the K-means model 212K and provides the K-means model 212K (which includes the centroid 224 and cluster radius 228) to the variance predictor 310 for determining the metric normalized distances 154K. As shown, the variance predictor 310 identifies historical point data values 152H within the trained K-means model 212K and inputs any provided novel point data values 152N to the trained K-means model 212K to determine the expected values 312 for the respective point data values 152. Based on the expected values 312 and the recorded or attributed values for the point data values 152, the metric normalized distance generator 314K generates the metric normalized distances 154K for the point data values 152N. The input point data values 152 (i.e., the historical point data values 152H and any novel point data values 152N) are compared to the position of the nearest centroid 224 and corresponding cluster radius 228 of the trained K-means model 212K, and the corresponding metric normalized distances 154K may be derived. The metric normalized distances 154K are provided to the detector 410 for determining whether the corresponding point data values 152 are anomalous point data values 152A and, optionally, to the data store 150 for incorporation into the data tables 158.

Referring back to FIG. 1, the detector 410, based on the determined variance value 154 (e.g., the reconstruction loss 154E and/or the metric normalized distance 154K) for a given input point data value 152, determines whether the input point data value 152 is an anomalous point data value 152A. For example, for an input historical point data value 152H and/or an input novel point data value 152N, the detector 410 compares the variance value 154 to a threshold variance value 412 and, when the variance value 154 for a point data value 152 satisfies the threshold variance value 412, the detector 410 determines that the respective point data value 152 is an anomalous point data value 152A. In other words, the detector 410 may pass the variance value 154 through a threshold detector of the detector 410 to determine the anomalous point data value 152A. The detector 410 may determine whether variance values 154 satisfy the threshold variance values 412 for each input point data value 152 or only for specified historical point data values 152H and novel point data values 152N.

Figure 4A:
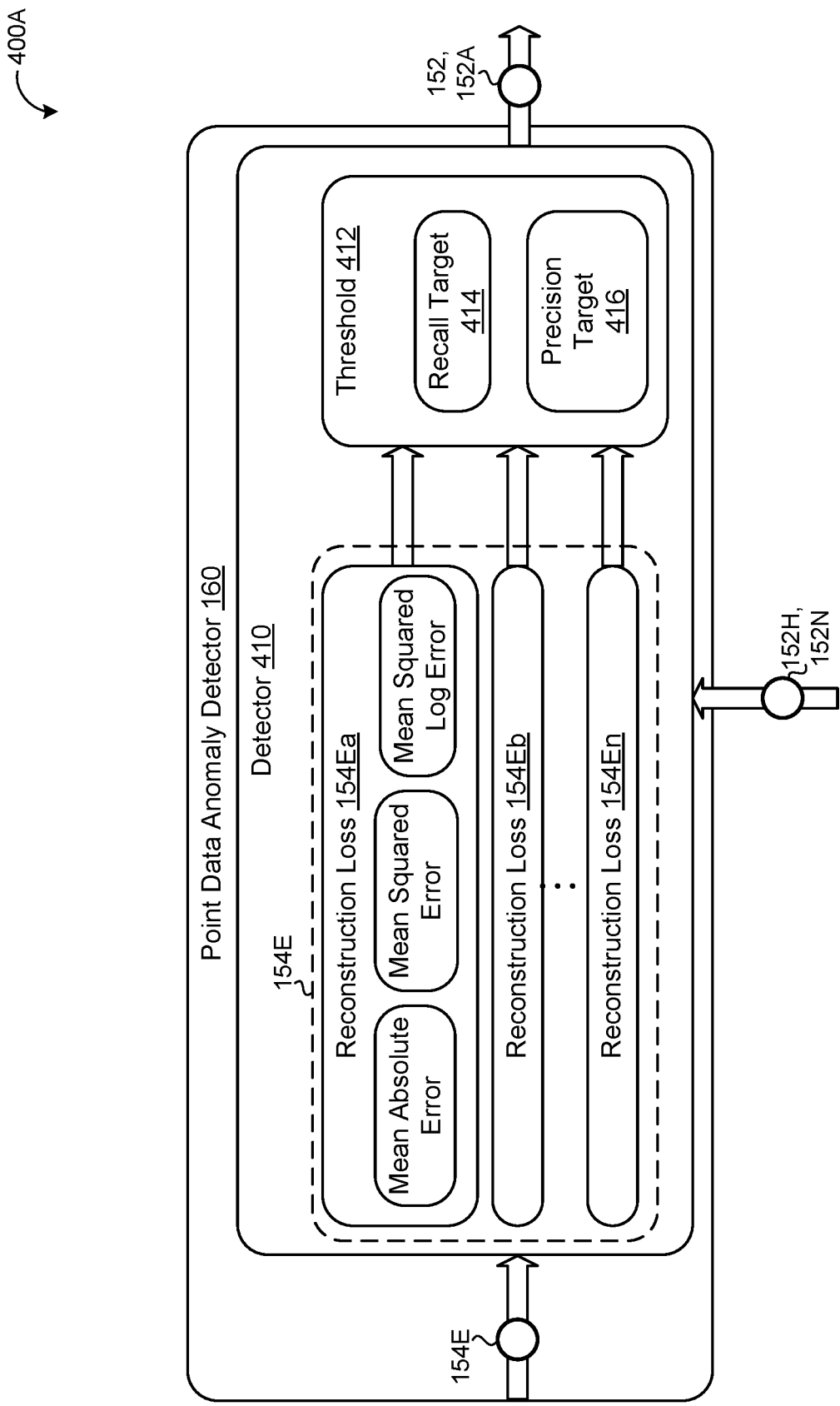
FIG. 4A is a schematic view of a detector of the system determining that point data values are anomalous point data values based on the variance values determined using the trained autoencoder model satisfying a threshold.

Thus, the threshold variance value 412 (or optionally, plurality of threshold variance values 412) defines criteria for determining the anomalous point data value 152A. For example, the detector 410 determines whether the variance value 154 is below a lower bound threshold value or above an upper bound threshold value (i.e., outside the bounds of an acceptable distribution for the variance value 154). The point data anomaly detector 160 may receive user input to determine the threshold variance value 412. For example, the point data anomaly detector 160 receives a recall target 414 and/or a precision target 416 from the user 12 (FIG. 4A). The recall target 414, in some implementations, represents a percentage or portion of the determined or identified anomalous point data values 152A out of the total number of anomalous point data values 152A present in the set of point data values 152. The precision target 416 may represent a percentage or portion of the determined or identified anomalous point data values 152A that are true anomalous point data values 152A and not false positives. Generally, there is a tradeoff between a high recall target 414 (i.e., catching anomalous point data values 152A) and a high precision target 416 (i.e., reducing false positives). Based on the use case, the user 12 may configure the tradeoff appropriately. For example, when diagnosing a disease, a large number of false positives are acceptable to ensure that most anomalies are detected. In this case, the user 12 may pick a threshold between 0.5 and 3.0 to ensure that at least 80% of the fraud can be detected.

When the reconstruction loss 154E satisfies the threshold variance value 412, the detector 410, in some examples, determines that the corresponding historical point data value 152H or novel point data value 152N is an anomalous point data value 152A. In this situation, the detector 410 may report the respective anomalous point data value 152A to the user 12.

Referring now to FIG. 4A, schematic view 400A includes an example where the generated model 212 is an autoencoder model 212E. Thus, the determined variance value 154 is a reconstruction loss 154E and the detector 410 determines if each reconstruction loss 154E satisfies the threshold variance value 412 (e.g., based on the recall target 414 and the precision target 416) and, when the reconstruction loss 154E for a respective point data value 152 satisfies the threshold variance value 412, the detector 410 identifies the point data value 152 as an anomalous point data value 152A. The detector 410 receives the reconstruction loss 154E output from the variance predictor 310 and the corresponding historical point data value 152H or novel point data value 152N that was provided as input to the model 212.

Optionally, the variance predictor 310 determines reconstruction loss 154E for the point data values 152 that include mean absolute error reconstruction loss, mean squared error reconstruction loss, and/or mean squared log error reconstruction loss and those metrics are evaluated by the detector 410 to determine whether the reconstruction loss 154E satisfies the threshold variance value 412. In some implementations, at least one of the mean absolute error, the mean squared error, or the mean squared log error of the reconstruction loss 154E is compared to a respective threshold 412 to determine the anomalous point data value 152A. For example, the detector 410 may compare the one of the values most likely to indicate the anomalous point data value 152A (such as an outlier of the mean absolute error, mean squared error, and mean squared log error) to the threshold 412. In other implementations, two or more of the mean absolute error, the mean squared error, or mean squared log error are combined to arrive at the reconstruction loss value 154E.

Figure 4B:
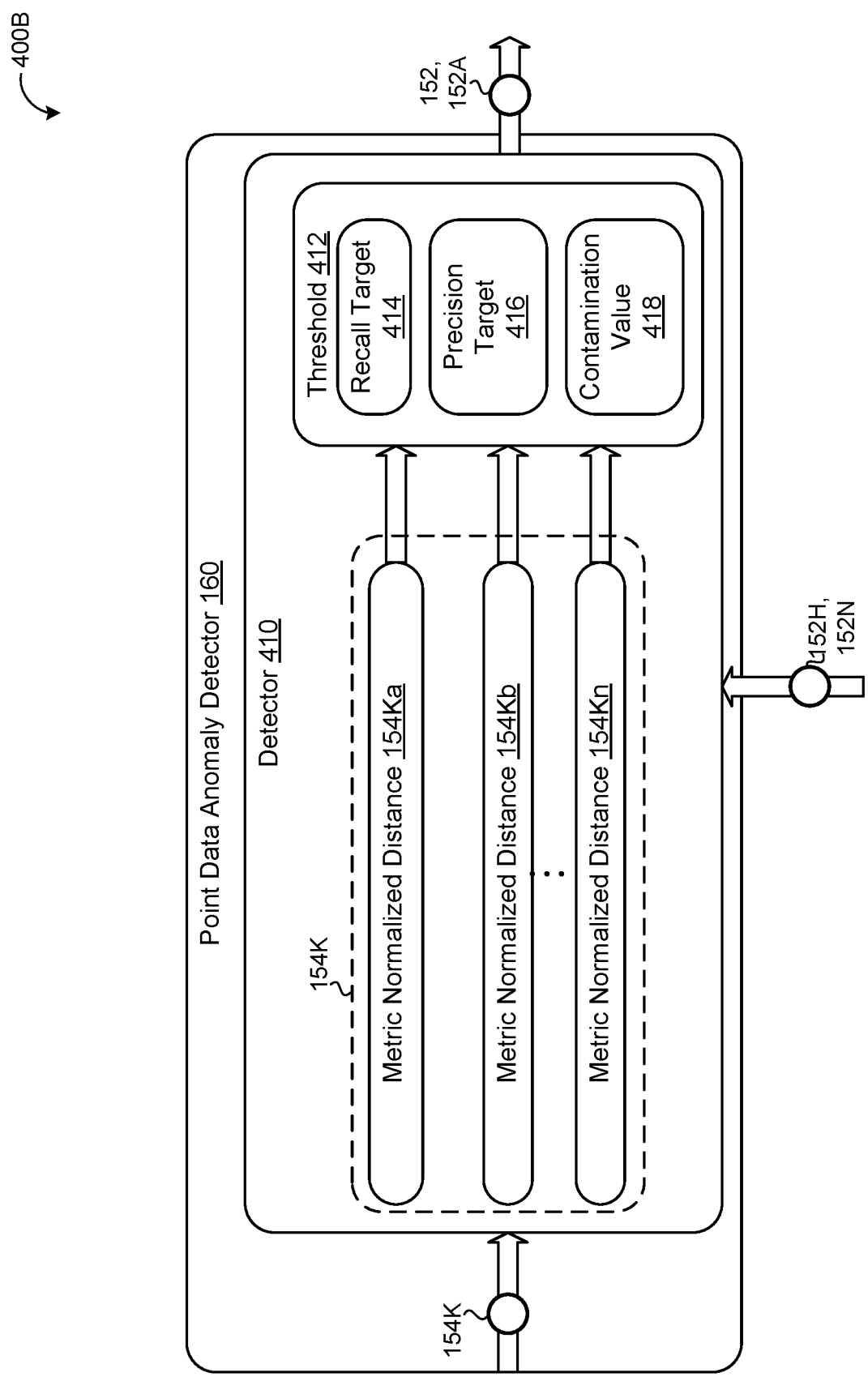
FIG. 4B is a schematic view of the detector determining the anomalous point data values based on the variance values determined using the trained K-means model satisfying a threshold.

Referring now to FIG. 4B, schematic view 400B includes an example where the generated model 212 is a K-means model 212K. Thus, the determined variance value 154 is a metric normalized distance 154K and the detector 410 determines whether each metric normalized distance 154K satisfies the threshold variance value 412 and, when the metric normalized distance 154K for a respective point data value 152 satisfies the threshold variance value 412, the detector 410 identifies the point data value 152 as an anomalous point data value 152A. For K-means models 212K, the threshold variance value 412 may be determined based on the recall target 414, the precision target 416, and/or a contamination value 418, which is the proportion of the point data values 152 being anomalous. The contamination value 418 may be provided by the user 12 to identify higher or lower numbers of anomalous point data values 152A. Optionally, the point data anomaly detector 160 determines the contamination value 418 by calculating the metric normalized distance 154K for the set of point data values 152, sorting the metric normalized distances 154K in descending order, and finding the threshold variance values 412 for anomalous point data values 152A. Here, the contamination value may be between 0 and 0.5.

Figure 5:
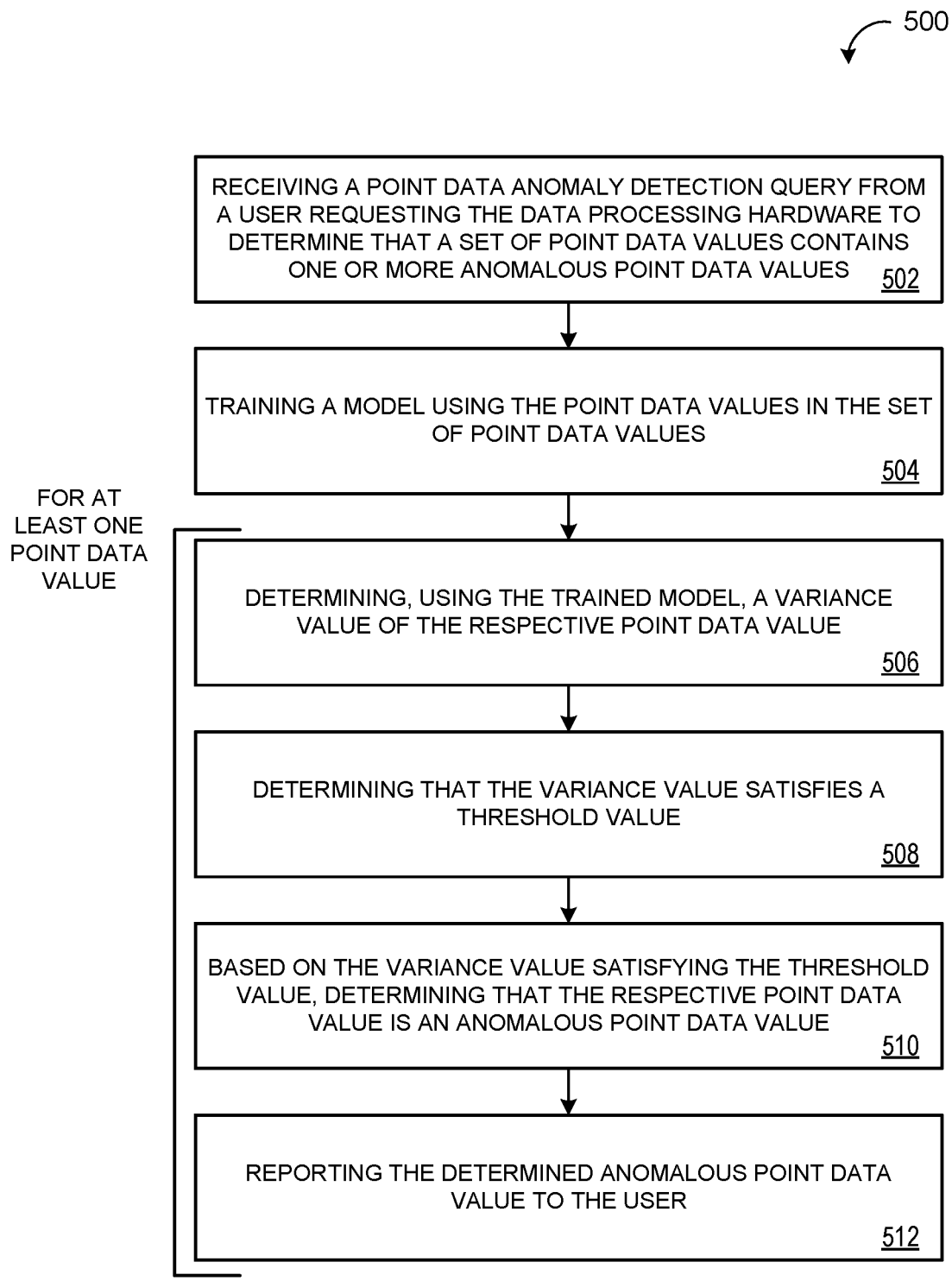
FIG. 5 is a flowchart of an example arrangement of operations for a method of detecting anomalies in point data.

FIG. 5 is a flowchart of an exemplary arrangement of operations for a method 500 of detecting anomalies in point data. The method 500, at operation 502, includes receiving a point data anomaly detection query 20 from a user 12. The point data anomaly detection query 20 requests data processing hardware 144 to determine that a set of point data values 152 contains one or more anomalous point data values 152A. At operation 504, the method 500 includes training a model 212 using the point data values 152 in the set of point data values 152. At operation 506, the method 500 includes, for at least one respective point data value 152 in the set of point data values 152, determining, using the trained model 212, a variance value 154 of the respective point data value 152. At operation 508, the method 500 includes determining that the variance value 154 satisfies a threshold variance value 412. Based on the variance value satisfying the threshold variance value 412, the method 500 includes, at operation 510, determining that the respective point data value 152 is an anomalous point data value 152A. At operation 512, the method 500 includes reporting the determined anomalous respective point data value 152A to the user 12.

Figure 6:
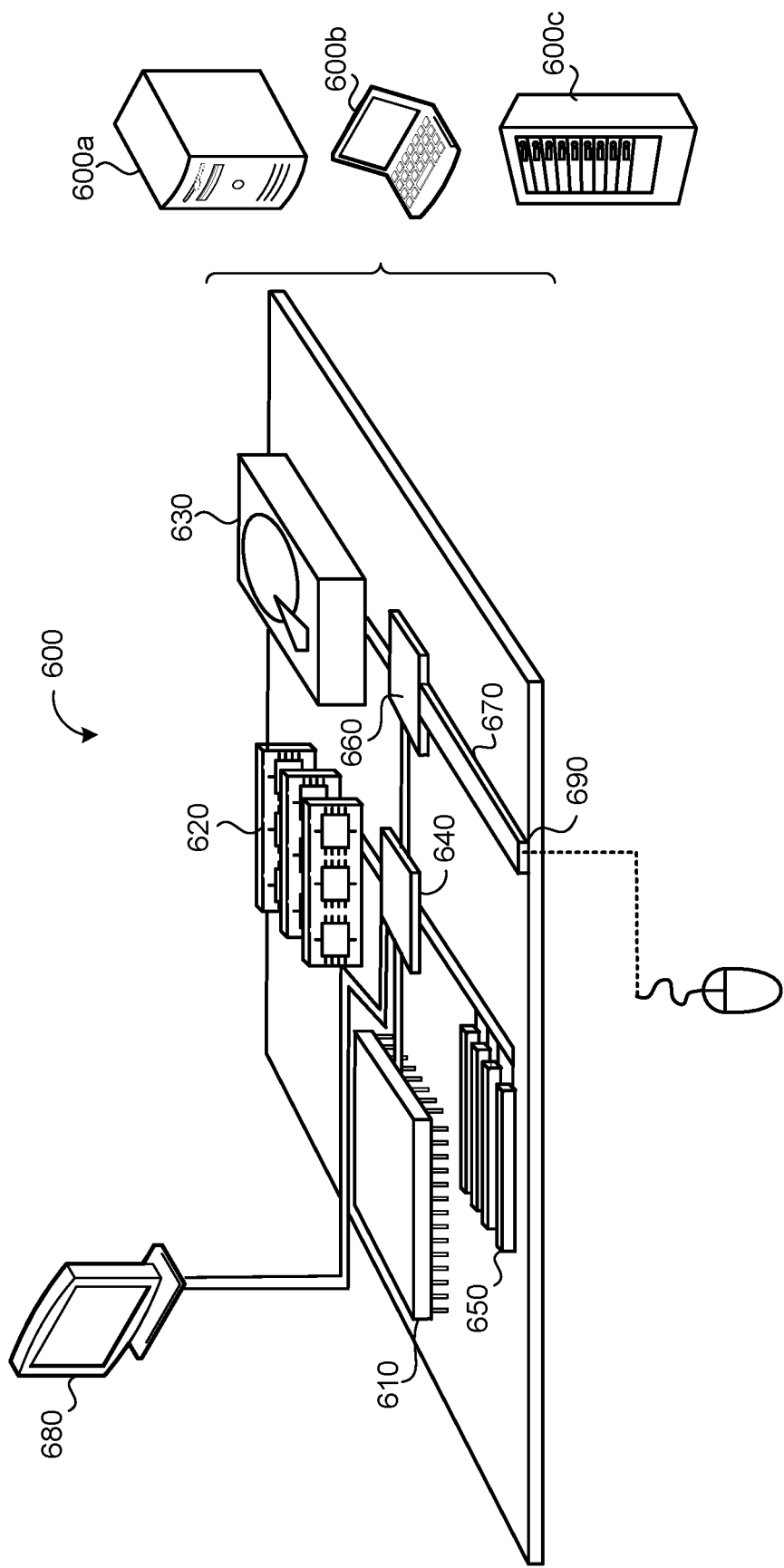
FIG. 6 is a schematic view of an example computing device that may be used to implement the systems and methods described herein.

FIG. 6 is schematic view of an example computing device 600 that may be used to implement the systems and methods described in this document. The computing device 600 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 600 includes a processor 610, memory 620, a storage device 630, a high-speed interface/controller 640 connecting to the memory 620 and high-speed expansion ports 650, and a low speed interface/controller 660 connecting to a low speed bus 670 and a storage device 630. Each of the components 610, 620, 630, 640, 650, and 660, are interconnected using various busses, and may be mounted on a common motherboard or in other manners as appropriate. The processor 610 can process instructions for execution within the computing device 600, including instructions stored in the memory 620 or on the storage device 630 to display graphical information for a graphical user interface (GUI) on an external input/output device, such as display 680 coupled to high speed interface 640. In other implementations, multiple processors and/or multiple buses may be used, as appropriate, along with multiple memories and types of memory. Also, multiple computing devices 600 may be connected, with each device providing portions of the necessary operations (e.g., as a server bank, a group of blade servers, or a multi-processor system).

The memory 620 stores information non-transitorily within the computing device 600. The memory 620 may be a computer-readable medium, a volatile memory unit(s), or non-volatile memory unit(s). The non-transitory memory 620 may be physical devices used to store programs (e.g., sequences of instructions) or data (e.g., program state information) on a temporary or permanent basis for use by the computing device 600. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 630 is capable of providing mass storage for the computing device 600. In some implementations, the storage device 630 is a computer-readable medium. In various different implementations, the storage device 630 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 620, the storage device 630, or memory on processor 610.

The high speed controller 640 manages bandwidth-intensive operations for the computing device 600, while the low speed controller 660 manages lower bandwidth-intensive operations. Such allocation of duties is exemplary only. In some implementations, the high-speed controller 640 is coupled to the memory 620, the display 680 (e.g., through a graphics processor or accelerator), and to the high-speed expansion ports 650, which may accept various expansion cards (not shown). In some implementations, the low-speed controller 660 is coupled to the storage device 630 and a low-speed expansion port 690. The low-speed expansion port 690, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 600 may be implemented in a number of different forms, as shown in the figure. For example, it may be implemented as a standard server 600a or multiple times in a group of such servers 600a, as a laptop computer 600b, or as part of a rack server system 600c.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

A software application (i.e., a software resource) may refer to computer software that causes a computing device to perform a task. In some examples, a software application may be referred to as an "application," an "app," or a "program." Example applications include, but are not limited to, system diagnostic applications, system management applications, system maintenance applications, word processing applications, spreadsheet applications, messaging applications, media streaming applications, social networking applications, and gaming applications.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices, magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback, and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A number of implementations have been described. Nevertheless, it will be understood that various modifications may be made without departing from the spirit and scope of the disclosure. Accordingly, other implementations are within the scope of the following claims.

What is claimed is:

1. A computer-implemented method executed by data processing hardware of a cloud database system that causes the data processing hardware to perform operations comprising:
    receiving a point data anomaly detection query from a user, the point data anomaly detection query requesting the data processing hardware to determine a quantity of anomalous point data values in a set of point data values; and
    in response to receiving the point data anomaly detection query:
        training, using unsupervised learning, a model using the set of point data values;

for at least one respective point data value in the set of point data values:
  determining, using the trained model, a variance value for the at least one respective point data value;
  determining that the variance value satisfies a threshold value; and
  determining that the at least one respective point data value is an anomalous point data value based on the variance value satisfying the threshold value; and
reporting the determined anomalous point data value to the user.

2. The method of claim 1, wherein the model comprises an autoencoder model.

3. The method of claim 2, wherein the autoencoder model comprises a sequence of hidden layers.

4. The method of claim 2, wherein the variance value comprises a reconstruction loss of the at least one respective point data value.

5. The method of claim 4, wherein determining the reconstruction loss of the at least one respective point data value comprises at least one of:
  determining a mean absolute error reconstruction loss;
  determining a mean squared error reconstruction loss; or
  determining a mean squared log error reconstruction loss.

6. The method of claim 1, wherein the model comprises a K-means model.

7. The method of claim 6, wherein the variance value comprises a metric normalized distance of the at least one respective point data value.

8. The method of claim 1, wherein the threshold value is based on a recall target or a precision target provided by the user.

9. The method of claim 1, wherein the point data anomaly detection query comprises a single Structured Query Language (SQL) query.

10. The method of claim 9, wherein the single SQL query requests the data processing hardware to determine respective quantities of anomalous point data values in a plurality of sets of point data values.

11. The method of claim 1, wherein the at least one respective point data value in the set of point data values comprises a historical point data value.

12. The method of claim 11, wherein the historical point data value is used to train the model.

13. The method of claim 1, wherein the operations further comprise, for an additional point data value not used to train the model, determining, using the trained model, a variance value for the additional point data value.

14. A system comprising:
data processing hardware; and
memory hardware in communication with the data processing hardware, the memory hardware storing instructions executed on the data processing hardware and causing the data processing hardware to perform operations comprising:
  receiving a point data anomaly detection query from a user, the point data anomaly detection query requesting the data processing hardware to determine a quantity of anomalous point data values in a set of point data values; and
  in response to receiving the point data anomaly detection query:
    training, using unsupervised learning, a model using the set of point data values;
    for at least one respective point data value in the set of point data values:
      determining, using the trained model, a variance value for the at least one respective point data value;
      determining that the variance value satisfies a threshold value; and
      determining that the at least one respective point data value is an anomalous point data value based on the variance value satisfying the threshold value; and
    reporting the determined anomalous point data value to the user.

15. The system of claim 14, wherein the model comprises an autoencoder model.

16. The system of claim 15, wherein the autoencoder model comprises a sequence of hidden layers.

17. The system of claim 15, wherein the variance value comprises a reconstruction loss of the at least one respective point data value.

18. The system of claim 17, wherein determining the reconstruction loss of the at least one respective point data value comprises at least one of:
  determining a mean absolute error reconstruction loss;
  determining a mean squared error reconstruction loss; or
  determining a mean squared log error reconstruction loss.

19. The system of claim 14, wherein the model comprises a K-means model.

20. The system of claim 19, wherein the variance value comprises a metric normalized distance of the at least one respective point data value.

21. The system of claim 14, wherein the threshold value is based on a recall target or a precision target provided by the user.

22. The system of claim 14, wherein the point data anomaly detection query comprises a single Structured Query Language (SQL) query.

23. The system of claim 22, wherein the single SQL query requests the data processing hardware to determine respective quantities of anomalous point data values in a plurality of sets of point data values.

24. The system of claim 14, wherein the at least one respective point data value in the set of point data values comprises a historical point data value.

25. The system of claim 24, wherein the historical point data value is used to train the model.

26. The system of claim 14, wherein the operations further comprise, for an additional point data value not used to train the model, determining, using the trained model, a variance value for the additional point data value.

* * * * *